ROBERT F. CLINE,
STANLEY J. MILLER, INVENTORS.
WHANN & McMANIGAL
Attorneys for Applicants ROBERT F. CLINE,
STANLEY J. MILLER, INVENTORS.
WHANN & McMANIGAL
Attorneys for Applicants ROBERT F. CLINE,
STANLEY J. MILLER, INVENTORS.
WHANN & Mc MANIGAL
Attorneys for Applicants

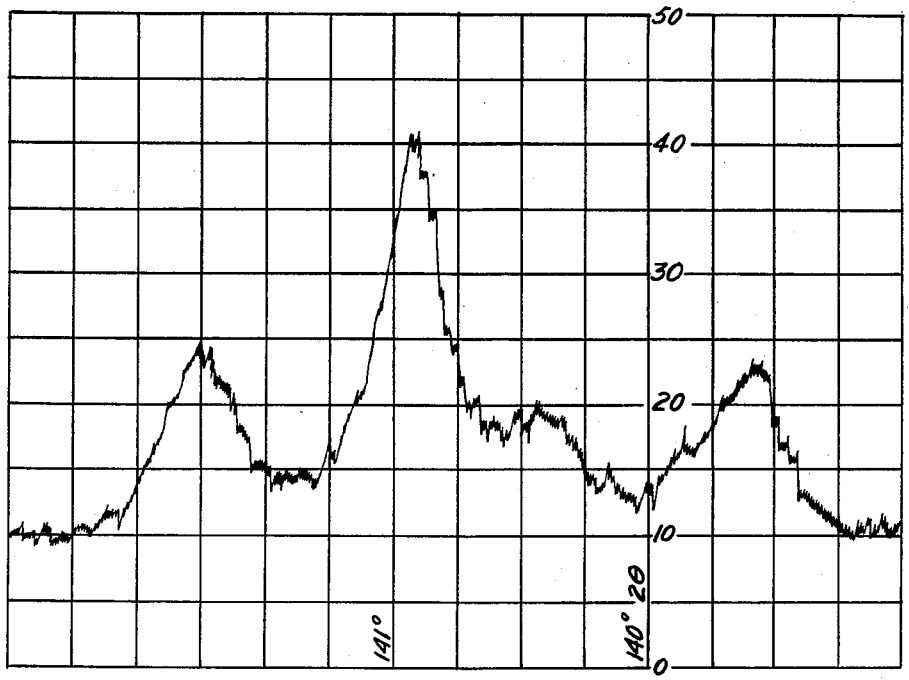
FIG. 1.
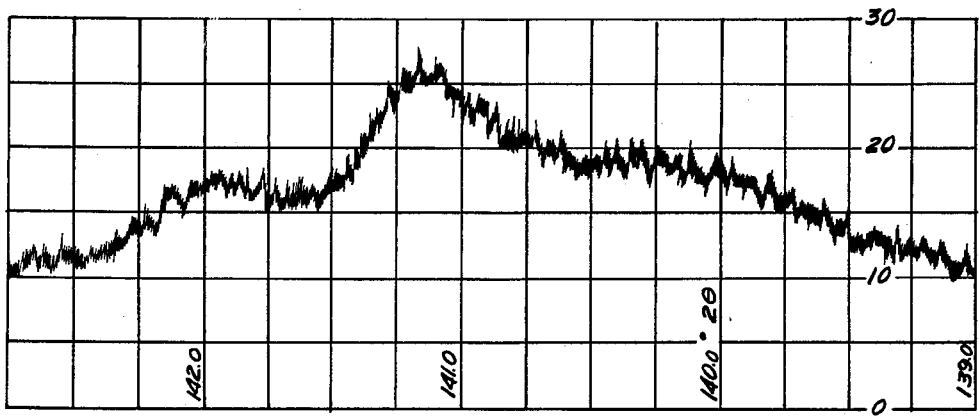
FIG. 2.
ROBERT F. CLINE,
STANLEY J. MILLER,
INVENTORS.
WHANN & McMANIGAL
Attorneys for Applicants

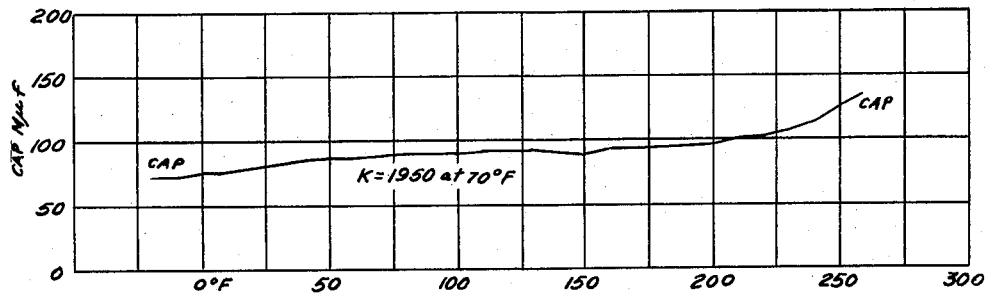
FIG. 14.
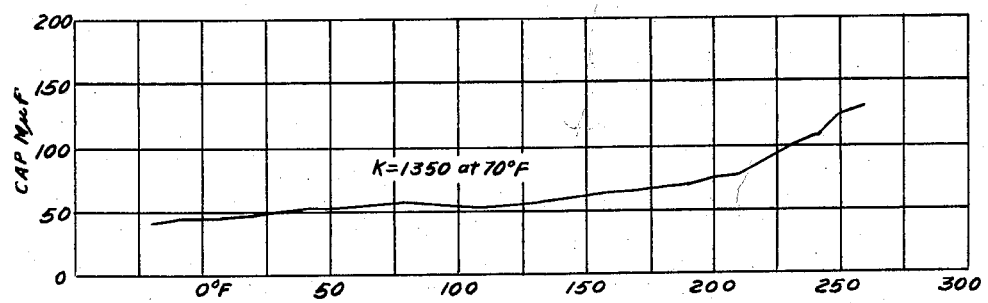
FIG. 15.
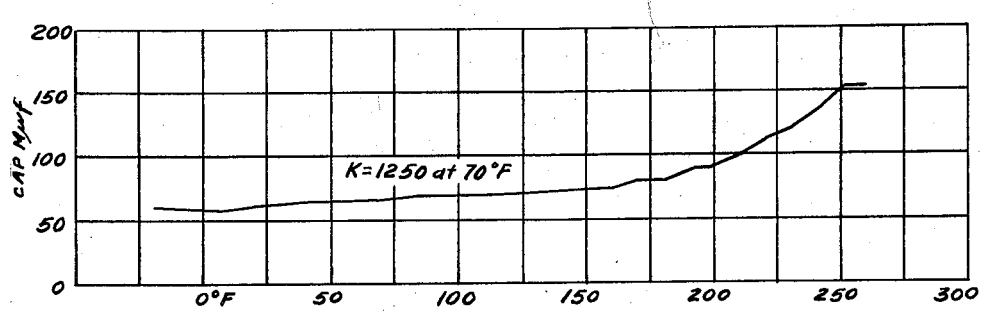
FIG. 16.
ROBERT F. CLINE,
STANLEY J. MILLER, INVENTORS.
WHANN & McMANIGAL
Attorneys for Applicants

ROBERT F. CLINE,
STANLEY J. MILLER, INVENTORS.
WHANN & McMANIGAL
Attorneys for Applicants Sept. 10, 1963   R. F. CLINE ETAL   3,103,440
ELECTROSTRICTIVE BARIUM TITANATE CERAMIC WITH
LINEAR TEMPERATURE CHARACTERISTICS
Filed Dec. 9, 1957   8 Sheets-Sheet 8

ROBERT F. CLINE,
STANLEY J. MILLER,
INVENTORS.
WHANN & Mc MANIGAL
Attorneys for Applicants by 3,103,440
ELECTROSTRICTIVE BARIUM TITANATE CERAMIC WITH LINEAR TEMPERATURE CHARACTERISTICS
Robert F. Cline, Whittier, and Stanley J. Miller, Los Angeles, Calif., assignors, by mesne assignments, to Gulton Industries, Inc., a corporation of New Jersey
Filed Dec. 9, 1957, Ser. No. 701,384
1 Claim. (Cl. 106—39)

This invention relates to fired electrostrictive barium titanate ceramic bodies and more particularly to such bodies including additives having the effect of controlling the crystal transformations in the bodies to achieve or closely approach linearity of electrical response characteristics of the bodies over a wide range of temperature. By controlling the crystal transformations, an effect which is evidenced by X-ray diffraction patterns, the capacitance characteristic is made substantially linear over a wide range of temperature and thermal ambiguities in the electromechanical (electrostrictive) response are greatly reduced. Ambiguities in the thermal coefficient of expansion are also greatly reduced.

Electrostrictive barium titanate material is a material which is being claimed in various adaptations in the earlier applications of Joseph W. Crownover, Serial No. 498,473, filed April 1, 1955, now U.S. Patent 2,835,761, and Serial No. 545,130, filed November 4, 1955, now U.S. Patent 2,836,501.

Electrostrictive materials are useful in the design and application of various types of transducers and other components. The electrostrictive effect is described in the earlier applications referred to and the basic phenomenon is described in the volume by Walter G. Cady entitled "Piezoelectricity" (McGraw-Hill Book Company, 1946). Briefly, electrostriction in the broader sense of dielectrics pertains to an interrelationship between the electric field and deformation of the dielectric in that field. Although this includes the piezoelectric phenomenon most authorities, in order to avoid confusion, reserve the term "electrostrictive" for the effect wherein the deformation of the dielectric material subjected to an electrostatic field is proportional to the square of the impressed electric field, thereby being independent of the applied field's polarity. Barium titanate electrostrictive ceramic materials are materials which retain only a negligible or insignificant polarization charge and the significance of this is that if the polarization of the ceramic may be retained and increased, it may also be decreased with the result that the ceramic as an actuator, or transducer, is unstable and is not practical for use in transducers, etc. Where the polarization charge is not being depended on for the deforming and actuating effect, the device operates effectively in one mechanical direction for either polarity of applied potential. The invention herein is concerned with electrostrictive barium titanate ceramic materials and its primary objective is to provide such materials wherein the electromechanical response of the material to the application of voltage is linear as respects temperature.

Barium titanate in its ordinary forms has the disadvantage of crystal transformations on transition through Curie points in the usual ambient temperature regions. It has been known to the prior art to include additives in the composition that will shift or reduce these Curie peaks for piezoelectric and dielectric applications to maintain the linearity of the piezoelectric response, or to maintain an improved dielectric characteristic. The present invention provides improved electrostrictive barium titanate ceramics having linear response characteristics. As explained in the foregoing, piezoelectric ceramics require a pre-polarizing voltage, whereas this is not true of the electrostrictive ceramics which do not retain or possess a remanent polarization charge; however, electrostrictive ceramics heretofore known have had thermal expansion ambiguities in the normal temperature ranges that have limited their application to temperature controlled units.

The present invention has as its objective, to provide, and has provided, and produced electrostrictive ceramics with thermal ambiguities completely removed or diminished to the extent that their effect is negligible. This has been accomplished by basically altering the crystalline structure of the barium titanate. This structure is well known to be cubic above 120° C., tetragonal below 120° C. to about 5° C. and orthorhombic for a range below that. These polymorphic transformations are usually sharp and result in the thermal ambiguities mentioned. The objective of this invention has been in part to remove these sharp polymorphic changes and thereby obtain a linear ceramic. This has been done by the addition of compounds to the ceramic slip before casting and firing. We have discovered a range or group of additives which will accomplish this purpose. These are compounds which influence the crystal parameters of the barium titanate so that growth is inhibited and the several polymorphic phases coexist, presumably, even in the same crystal. In this way there is no sharp change from one crystal type to another and the capacitance or motion vs. temperature curves will vary only about 20% from −20 to 200° F. instead of the usual several hundred percent.

We have discovered a combination of additives so that maximum motion, i.e., maximum electrostrictive mechanical response with minimum variations occasioned by temperature, can be obtained. Actually, the new compositions represent a compromise in ultimate results sought since the two properties referred to may be varied widely and are inversely related. As an example, electrostrictive motion or response may be controlled by additives such as $TiO_2$, $SnO_2$ or $ZrO_2$. Each of these also influences the $c/a$ ratio of the crystals. The crystal growth and coexistence of polymorphic forms is influenced by such compounds as $Bi_2O_3$ and $CeO_2$. Thus, a typical formulation is barium titanate with 1 mol percent $TiO_2$, 2 mol percent $ZrO_2$, and 1 mol percent $\frac{1}{2}(Bi_2O_3)$.

The mol percentages of the bismuth compounds in Table II are based on one-half the molecular weight of the compound or upon one atom of bismuth as shown.

Such a modified ceramic possesses more than adequate electrostrictive motion or response for kinetic application with both the undesirable thermal polymorphic changes and residual piezoelectric or memory characteristics reduced to immaterial functions, i.e., the ceramic does not retain significant remanent polarization charge. With the undesirable thermal polymorphic changes eliminated or minimized, the thermal coefficient of expansion becomes a continuous function with temperature over the working range. The electromechanical (electrostrictive) response, i.e., the change in physical dimensions in response to application of a given voltage gradient, is much more uniform over a wide range of temperature. Thus, when the material is used in electrostrictive relays the operating voltage (pull-in voltage) is uniform over a wide temperature range.

In regard to the electrostrictive motion in the barium titanate materials of this invention, there is no accepted theory or explanation for it. It is not known why or how exactly the additives affect the motion. The effect of the additives, however, can be briefly summarized. As is known, barium titanate has a Perovskite structure which is a simple cubic structure with a body-centered, face-centered unit cell. This structure, unlike most, will accept a wide range of substituents and many substituents have been tried and a good many of them are known to the prior art and their effect. The elements tin and zirconium, as substituents in this invention, it has been found, enhanced the electrostrictive effect and they also shift the Curie peak somewhat. The effect of titanium dioxide is to produce the required barium oxide deficit which contributes to and increases the electrostrictive effect, and also contributes to the fluxing of the ceramic material during firing. On the other hand, titanium dioxide may sharpen, i.e., enhance, the Curie and memory peaks. Zirconium, as zirconium dioxide, contributes to electrostrictive motion as a $+4$ unbalancing additive and also shifts the Curie peaks; however, alone or balanced with $+2$ oxides, it leaves the peaks in working range and does not contribute as much to motion as the corresponding tin compounds. Tin, as stannic oxide, produces good electrostrictive motion but unfortunately it appears also to enhance the Curie peaks and moves them into the required working temperature range. Cerium, a rare earth, has the effect that as an additive the material exhibits electrostrictive motion, although the X-ray diffraction patterns and Curie curve data indicate the crystals to be cubic in the room temperature range. The effect of bismuth, which is a $+3$ element, is that it drastically reduces crystal size. In the form of the stannate, bismuth alone and in combination with other tin compounds is able to produce ceramic bodies having high dielectric constant and with uniform electrical properties over wide temperature ranges. In admixture, with other $+4$ oxides, such as zirconium or titania, bismuth oxide contributes to the flat characteristic of capacitance in a ceramic having electrostrictive motion.

The foregoing briefly summarizes the observed effects of various additives included in the table of compositions herein. The combinations of additives shown in the table have been found to produce a material having the desired characteristics, i.e., a material possessing the electrostrictive property and having linear response characteristics as distinguished from the anomalies in this respect of previously known materials.

Accordingly, it is an object of the invention to provide improved electrostrictive barium titanate ceramic bodies having electrical response properties which have linear temperature characteristics.

Another object is to provide barium titanate electrostrictive compositions having additives therein which inhibit crystal growth and prevent sharp change from one crystal type to another in response to temperature variations.

Another object is to provide barium titanate compositions having additives such that the material has substantial electrostrictive properties and further additives permitting the coexistence of polymorphic crystal forms whereby there is no sharp change from one crystal form to another, with the result that the electromechanical response characteristic is substantially linear through a wide range of temperature.

Another object is to provide barium titanate compositions as in the foregoing object, consisting of barium titanate in major amount and having minor additives to render the material electrostrictive or to enhance the electrostrictivity, the additives consisting of one or more selected from the group consisting of titanium, tin and zirconium, and the material having an additional additive in minor percentage for controlling crystal growth whereby there is no sharp change from one crystal form to another so that the electromechanical response characteristic is substantially linear through a wide range of temperature.

Further objects and numerous advantages of the invention will become apparent from the following description and drawings wherein:

FIG. 1 is an X-ray diffraction pattern for a barium titanate composition containing 1 mol percent titanium dioxide and 2 mol percent zirconia.

FIG. 2 is an X-ray diffraction pattern of a composition as in FIG. 1 with the addition of bismuth oxide (Example D).

FIG. 14 is a graph of temperature vs. capacitance for the material of Example K.

FIG. 15 is a graph of temperature vs. capacitance for the material of Example L.

FIG. 16 is a graph of temperature vs. capacitance for the material of Example M.

Figure 3:
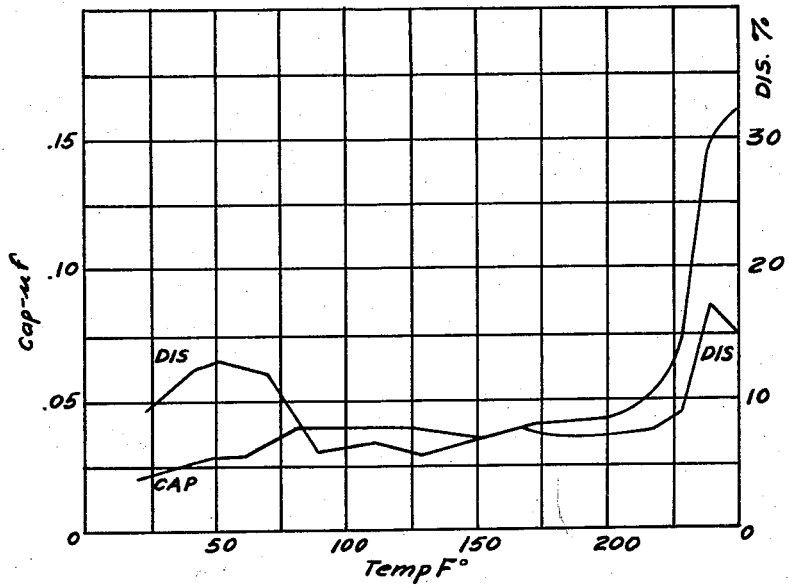
FIG. 3 is a graph of temperature vs. capacitance for the composition of FIG. 1, illustrating the variations of capacitance with temperature beyond usable limits.

In accordance with the invention, a fired ceramic dielectric body comprises barium titanate in major amount and a minor percentage of titanium dioxide, stannic oxide, zirconium dioxide and bismuth stannate or bismuth oxide. In a typical composition the proportion of titanium dioxide as added in the mix is substantially 1 mol percent; that of zirconium dioxide 2 mol percent and bismuth added as bismuth oxide in the amount of 1 mol percent. These amounts are calculated on the total weight of composition mixture.

The foregoing proportions represent essentially the final composition. As indicated in the table, the bismuth and tin oxide may be introduced into the composition in various forms. The chemical formulae of the compounds which contain the bismuth oxide, tin oxide and zirconia in the final product are relatively unimportant. The significant aspects of the invention are the additives, as pointed out, in such amounts as to vary the crystal structure as described to bring about linearity. The exact chemical form of the additives in the fired body is not a critical part of the invention, but the crystallographic form of the fired body is significant. The crystal structure of the bodies of this invention is evidenced by the X-ray diffraction patterns included herewith. The percentages of the additives is subject to some variation, but within relatively small ranges as shown in the tables.

In prior known barium titanate ceramics, as pointed out in the foregoing, at least three crystalline structures exist in the temperature range from above 120° C. to below 5° C. The effect of the addition of the compounds such as $TiO_2$, $SnO_2$ or $ZrO_2$ in the material of this invention is to control the electrostrictive motion. The addition of the bismuth stannate, $Bi_2O_3$ or $CeO_2$ has the effect of controlling crystal growth and the coexistence of polymorphic forms without significantly reducing the electrostrictive motion of the resulting material. The proportions of the two additives are selected so that there is adequate electrostrictive motion for kinetic application with both the undesirable thermal polymorphic changes and residual piezoelectric or memory characteristics reduced to immaterial functions.

The green ceramic bodies may be prepared from comminuted powders in the proportions listed in the table in a manner conventional with barium titanate electrical ceramics, the bodies then being fired using conventional techniques. When barium titanate ceramics are prepared for use in transducers it is often desirable to form the ceramic in uniformly thin films. The ceramics of this invention may be prepared in accordance with these known techniques of the prior art, such as are disclosed in the patents of Wainer No. 2,399,052, Howatt No. 2,486,410 and No. 2,582,993 or Lies No. 2,539,446. For preparing the materials in very uniformly thin sheets or films a process or technique of casting onto a moving belt is preferred.

For application in transducers or the like, it is desired that the ceramics be in uniformly thin sheets. For successful utilization of the ceramics in thin sheets in various electrical applications the process outlined below is preferred. This process has resulted in successful production of ceramics in uniformly thin sheets which met all of the requirements for successful utilization in various electrical applications, i.e., these ceramics were satisfactory in all respects, including that they could readily be fired in a ceramic kiln to yield a physically dense, non-porous, well-bonded ceramic structure having the desired electrical properties and physical characteristics. The electrical properties in these particular ceramics were, of course, the fact that the ceramic had satisfactory electrostrictive response, i.e., the electromechanical (electrostrictive) motion from the ceramic was satisfactory. Also, these ceramics displayed satisfactory characteristics as respects capacitance and dielectric constant vs. temperature. These characteristics were substantially linear as described herein. Furthermore, as otherwise discussed, the thermal ambiguities were reduced to a negligible function.

In preparing the compositions of this invention the ingredients listed in Table I, in the form of comminuted powders, were mixed into an intimate, thoroughly dispersed slurry of suitable resinous temporary binder. The mol and weight percentages of the additives are given in Table II. The resinous temporary binder comprised polymerized turpentine and methyl methacrylate in ethylene dichloride as a solvent. This is a material known commercially as "Dekophane." The dry powders and resinous binder are mixed to yield a slurry having a uniform distribution after several hours of mixing in a ball mill. The length of time required for mixing will vary with temperature and the viscosity of the slurry. The viscosity is adjusted according to the thickness desired in the finished ware by adding solvent or evaporating solvent. It was found that twenty to fifty hours of milling yielded good results with the ball mill containing grinding media of alumina rods. A porcelain mill was used in preference to metal to avoid unnecessary metallic contamination. The ethylene dichloride solvent is mixed in an amount to yield the consistency of mix desired. This may be arrived at by a certain amount of experimenting with the casting machine operation and temperature to yield the required thickness of cast material.

The viscosity, after milling, could be checked with a viscosimeter and if necessary adjusted with the addition or removal of solvent (ethylene dichloride) to obtain the correct value for the thickness of ware desired. The removal of solvent was accomplished by reducing pressure and evaporating at room temperature.

The casting machine used was of a type shown in the earlier application of Crownover, Serial No. 425,664, filed April 26, 1954, now U.S. Patent 2,841,827. The slurry was pumped from the mixing mill to the reservoir of the casting machine. The material might be cast on a horizontal moving belt; however, in this instance the ware was cast into a thin flexible sheet by forming or an inclined, moving steel belt which passed through a warmed oven to evaporate the solvent and complete the cure of the resin. The drying oven of the casting machine was maintained at a temperature of 120° F. to 140° F. to evaporate the solvent at a rate, and for a period of time, that permitted curing without producing bubbles and blisters in the ware and yet dried the material throughout the full thickness to form a firm, non-tacky, flexible sheet. A silicone parting compound on the belt permitted the cured film to be removed over a separation blade. By this means ware could be produced in thickness of the order of $2 \times 10^{-3}$ inch to $20 \times 10^{-3}$ inch. The thickness, of course, was a function of slurry viscosity, belt angle and belt speed, and the distance from reservoir surface to the level at which the belt was oriented to the horizontal plane of the upper reach of the belt. The casting procedure produced a thin, strong, flexible sheet of "greenware," or unfired ceramic.

The long strip of flexible ware called "greenware" was easily cut, by using a punch and die, into the desired size of length and width, say ¾" wide by 4" long, which was one size selected for a specific application.

It is possible at this stage to store the greenware in these strips for some considerable time prior to cutting, if desired. The one precaution that must be taken is to maintain an atmosphere of the solvent to prevent the resinous temporary binder from becoming too hard and brittle.

Next, the ware is loaded onto supporting plates or batts of fused, stabilized zirconia, on which the ware is fired in a ceramic kiln where the temporary binder is burned off and the ceramic particles cured and grown at high temperature to a crystalline, well-bonded structure.

The firing operation is a very critical part of the process in order to produce successfully all of the desired final physical and electrical characteristics in the final ware. It should be noted that variations in characteristics resulted from variations in the firing conditions, and these must be determined for a given set of conditions to arrive at the desired results. For example, the ware must be heated at a rate less than approximately 700° F./hour up to 1200° F. to burn off the temporary binder in a uniform manner. A rate of heating much larger than this would yield warped and bubbled ware due to excessive internal vapor pressures building up more rapidly than the semi-porous body could pass them to the atmosphere. From this temperature up to the final firing temperature, the ware should be heated uniformly to provide essentially uniform growth of the crystals throughout the length and width of a given piece. The rate of heating is mostly governed at this stage by the kiln furniture, which has a short life of a few passes through the kiln if thermal shock stresses become too severe. The rate of 1000° F. per hour has been successfully used to heat loads from 1000° F. to 2400° F. The final firing temperature and the time at that temperature were found to be very critical. A temperature of 2380 to 2390° was found satisfactory for one mixture when this temperature was held for approximately thirty minutes. A temperature lower than this by 10 or 20° F. was found to leave the finished ware somewhat amorphous in nature. Some crystals had started to form but were small and had made a physically bonded structure, but the porosity was such that when touched with a drop of ink the ink spread out and through the specimen as on a blotter. A correct firing condition yielded well-sealed specimens, while an over-fired condition was indicated with crystals that were larger and frequently not well enough bonded to seal the region between crystals to prevent transmission of ink. Also, chemical analyses showed that excessive temperature also caused additives to be driven out of the structure.

The atmosphere was found to be a subject requiring control. It was necessary to maintain an oxidizing condition and yet the rate of air motion was kept low with just enough velocity to carry away the fumes of the temporary binder.

In addition to such as are generally mentioned above, specific examples of mixes which produced particular compositions are given below.

TABLE I

*Examples of Slip Mixtures*

[Parts by weight]

| Example | $BaTiO_3$ | $TiO_2$ | $SnO_2$ | $ZrO_2$ | $Bi_2O_3$ | $Bi_2(SnO_3)_3$ | $CeO_2$ | Resin | Solvent |
|---|---|---|---|---|---|---|---|---|---|
| B | 891.8 | 3.2 | 6.0 | 4.9 | 9.3 | | | 765 | 600 |
| C | 905.1 | | | 9.8 | 9.3 | | | 739 | 592 |
| D | 891.8 | 3.2 | | 9.8 | 9.3 | | | 732 | 586 |
| F | 900.4 | 3.2 | | | 9.3 | 9.2 | | 765 | 600 |
| I | 443.2 | | | 4.9 | | | 10.3 | 550 | 296 |

In a specific example of the preparation of one of the compositions of this invention (Example D), commercial barium titanate, titanium dioxide, zirconium dioxide and bismuth oxide in the form of dry, finely comminuted powders were mixed in the proportions given in the tables with the resinous solvent to form a slurry by ball milling the mixture in a porcelain mill with alumina rods for forty hours. The viscosity of the slurry was adjusted slightly by adding solvent, or evaporating solvent, so that at the temperature used for preparing a film, or sheet, a thickness was obtained at a nominal value between the order of $2 \times 10^{-3}$ inch to $20 \times 10^{-3}$. The slurry was cast in the casting machine, as described, and the reservoir, or hopper, of the casting machine was filled to a level such that at the viscosity of the slurry a film was formed within the thickness set forth above.

The drying oven of the casting machine was held at a temperature of from 100° F. to 120° F. and the ware passed through during a period of thirty minutes, which was sufficient time to evaporate the solvent at a rate which permitted curing without producing bubbles and blisters in the ware, and yet adequately dried the material. The resulting greenware was then cut as described and fired in a ceramic kiln. The ware was heated in the kiln at a rate of 500° F./hour up to 1250° F. to burn off the temporary binder in a uniform manner. From this temperature up to the final firing temperature the ware was heated uniformly at a rate of 650° F./hour up to 1900° F. 1900° F. was maintained for five hours. The final firing temperature for this example was 2400° F. to 2420° F., this temperature being held for approximately twenty minutes. In reaching this final temperature the ware was heated at a rate of 67° F./hour. The kiln was then cooled to a temperature of 600° F. in twenty hours before the door was cracked open to cool to room temperature.

The resulting fired ware was analyzed in many ways. A suitable conducting layer of silver was applied to the pieces of ceramic as a silver frit fired at approximately 1300° F. Other conductive coatings were also used, such as copper, nickel, aluminum, gold and some others applied by a vacuum evaporation process. The specimen could then be tested to determine its electrostrictive motion. This was done over a range of temperature to compare the electrostrictive effect of this material with that of other electrostrictive materials, as illustrated in the figures. Capacitance and loss factor were also measured over the same temperature range.

Another analysis consisted of microscopic examination of the ceramic as fired to determined the crystal size for judging the degree of firing. A uniform finely crystalline structure was desired.

Also, X-ray diffraction measurements were made to indicate the inhibition of crystal growth and coexistence of polymorphic crystal forms. X-ray diffraction charts were obtained from a sample of ceramic as fired and a conductive coating on the faces of a sample provided the means for obtaining electrical test data, such as electrostrictive motion, the value of K, loss factor for various values of potential gradient.

It was found that relatively small amounts of addition agents could make a very large change in characteristics.

The X-ray diffraction pattern indicated the co-existence of crystal forms and the inhibition of crystal growth. Barium titanate with 1 mol percent $TiO_2$ and 2 mol percent $ZrO_2$ gives a pattern as shown by the peaks starting at 138.5° in FIG. 1. The addition of $Bi_2O_3$ changed the same peak as shown in FIG. 2. The lower intensity of the second peak is indicative of the smaller crystals present and the smoothness of the peak is characteristic of the blending produced by a series of overlapping peaks, such as cubic, orthorhombic and tetragonal in the same pattern.

The reduced temperature anomalies are illustrated by the difference in temperature vs. capacitance graphs for the same two materials. The first formula gives variations beyond usable limits, as shown in FIG. 3

Figure 4:
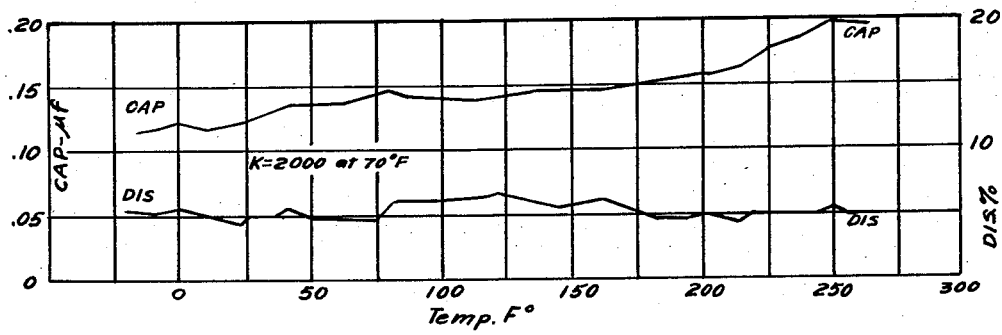
FIG. 4 is a graph of temperature vs. capacitance for the composition of FIG. 2, illustrating the stability of the capacitance and dielectric constant with respect to temperature.
Figure 5:
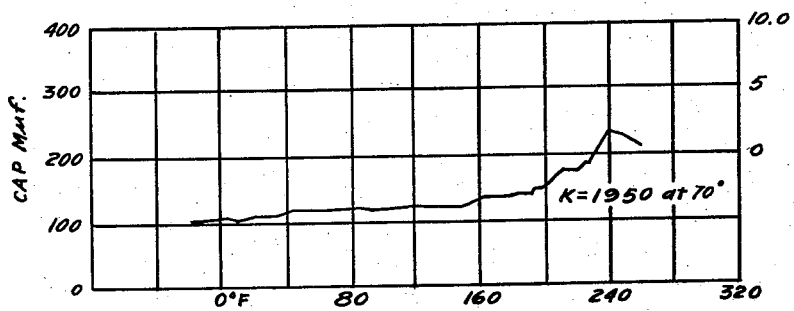
FIG. 5 is a graph of temperature vs. capacitance for the material of Example A.
Figure 6:
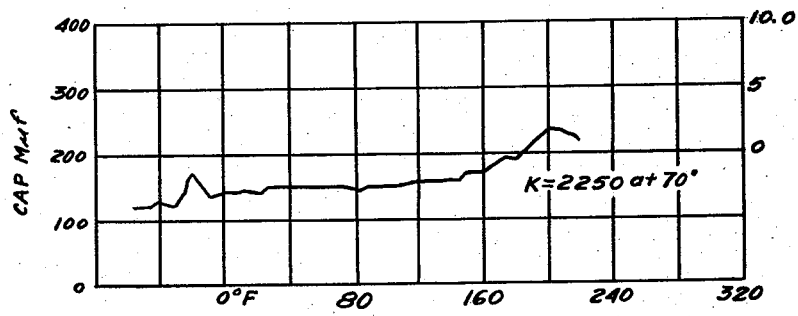
FIG. 6 is a graph of temperature vs. capacitance for the material of Example 3.
Figure 7:
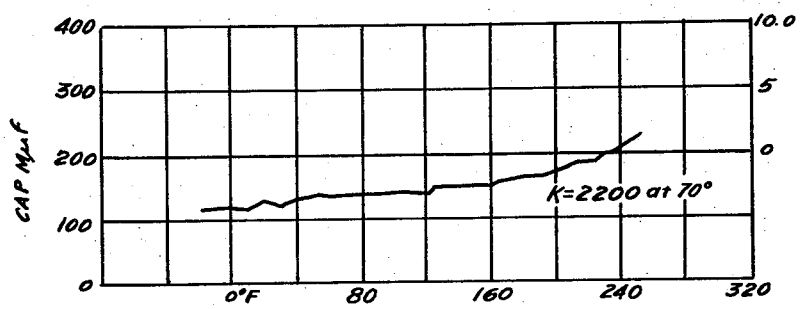
FIG. 7 is a graph of temperature vs. capacitance for the material of Example C.
Figure 8:
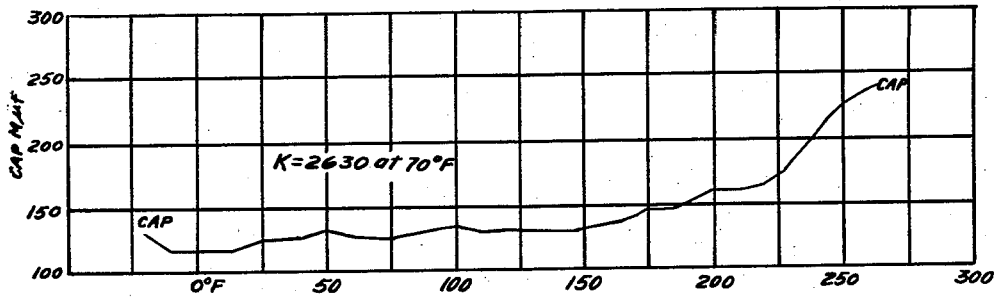
FIG. 8 is a graph of temperature vs. capacitance for the material of Example E.
Figure 9:
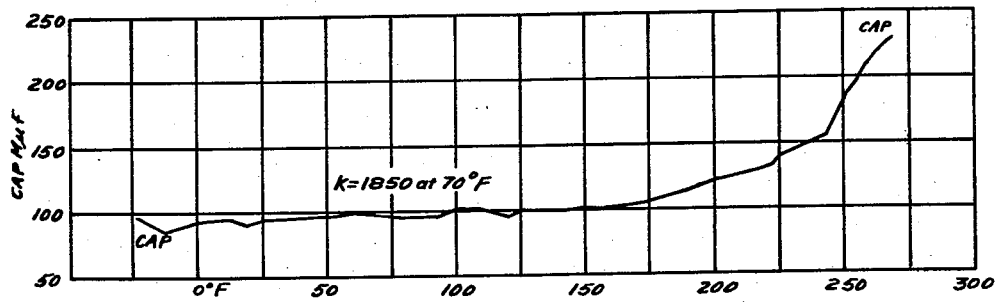
FIG. 9 is a graph of temperature vs. capacitance for the material of Example F.
Figure 10:
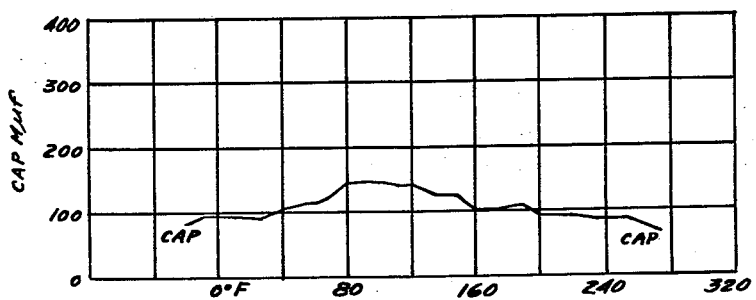
FIG. 10 is a graph of temperature vs. capacitance for the material of Example G.
Figure 11:
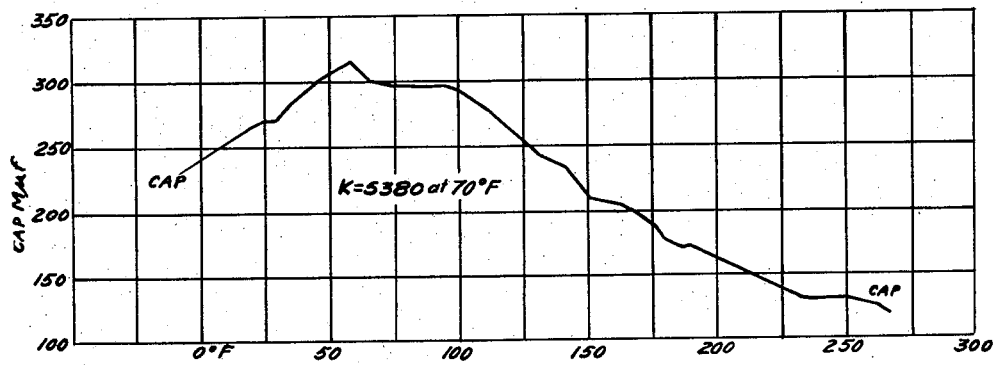
FIG. 11 is a graph of temperature vs. capacitance for the material of Example H.
Figure 12:
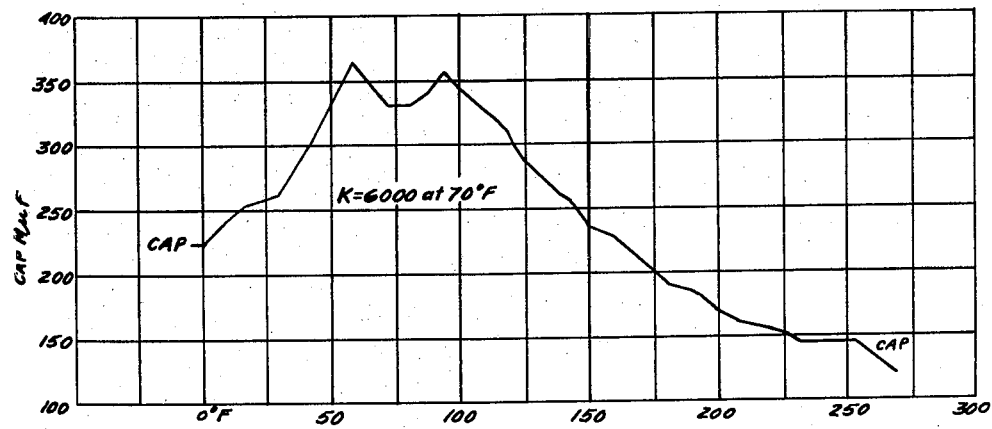
FIG. 12 is a graph of temperature vs. capacitance for the material of Example I.
Figure 13:
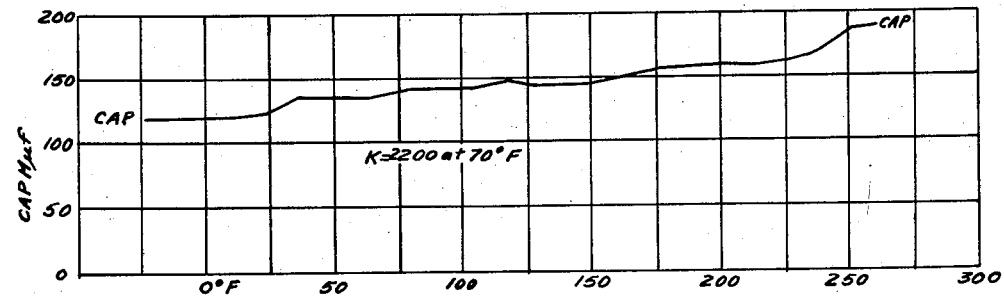
FIG. 13 is a graph of temperature vs. capacitance for the material of Example J.
Figure 17:
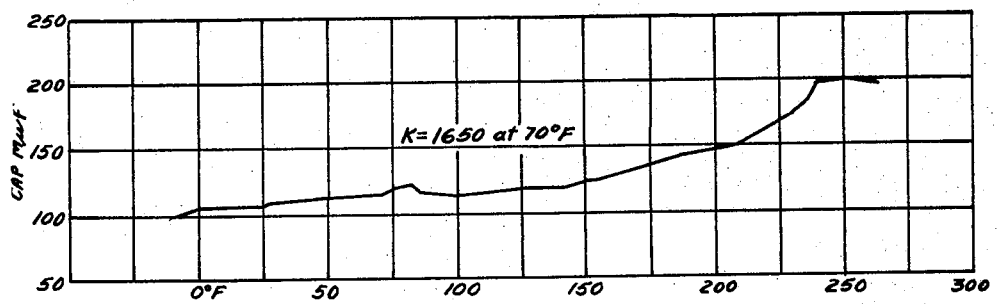
FIG. 17 is a graph of temperature vs. capacitance for the material of Example N.
Figure 18:
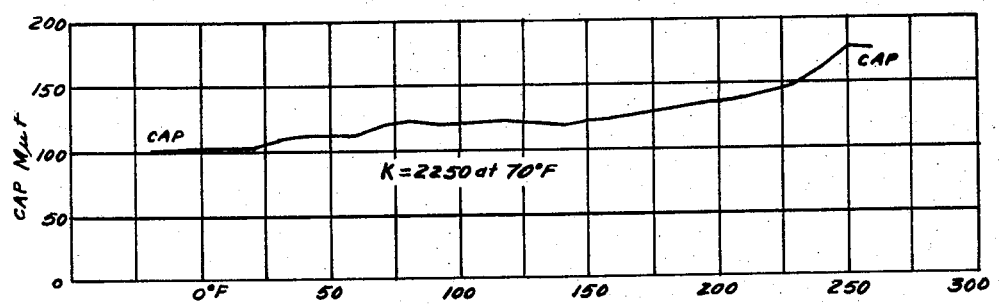
FIG. 18 is a graph of temperature vs. capacitance for the material of Example O.
Figure 19:
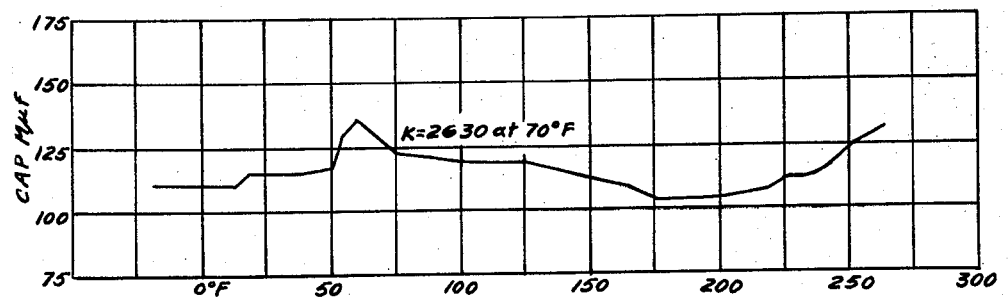
FIG. 19 is a graph of temperature vs. capacitance for the material of Example P.

The linear ceramic exhibits very stable properties, as shown in FIG. 4.

Properly interpreting the diffraction patterns of FIGS. 1 and 2 in the light of electrical properties as shown in FIGS. 3 and 4, it is seen that the additives modify the crystal structure and growth in such a way that electrical properties are stabilized over the useful temperature range. The electromechanical (electrostrictive) response and the thermal coefficient of expansion stabilize along with the stabilization of capacitance and dielectric constant.

FIGS. 5 through 19 are characteristic capacity vs. temperature curves for the examples of the compositions in Table II, i.e., A, B, C and E through P respectively. An inspection of the curves reveals the improved linearity of the material as compared to ordinary barium titanate. All of the materials had satisfactory dielectric constant, as indicated on the graphs, and the loss characteristics were favorable, being comparable to those indicated in FIG. 4.

Figure 20:
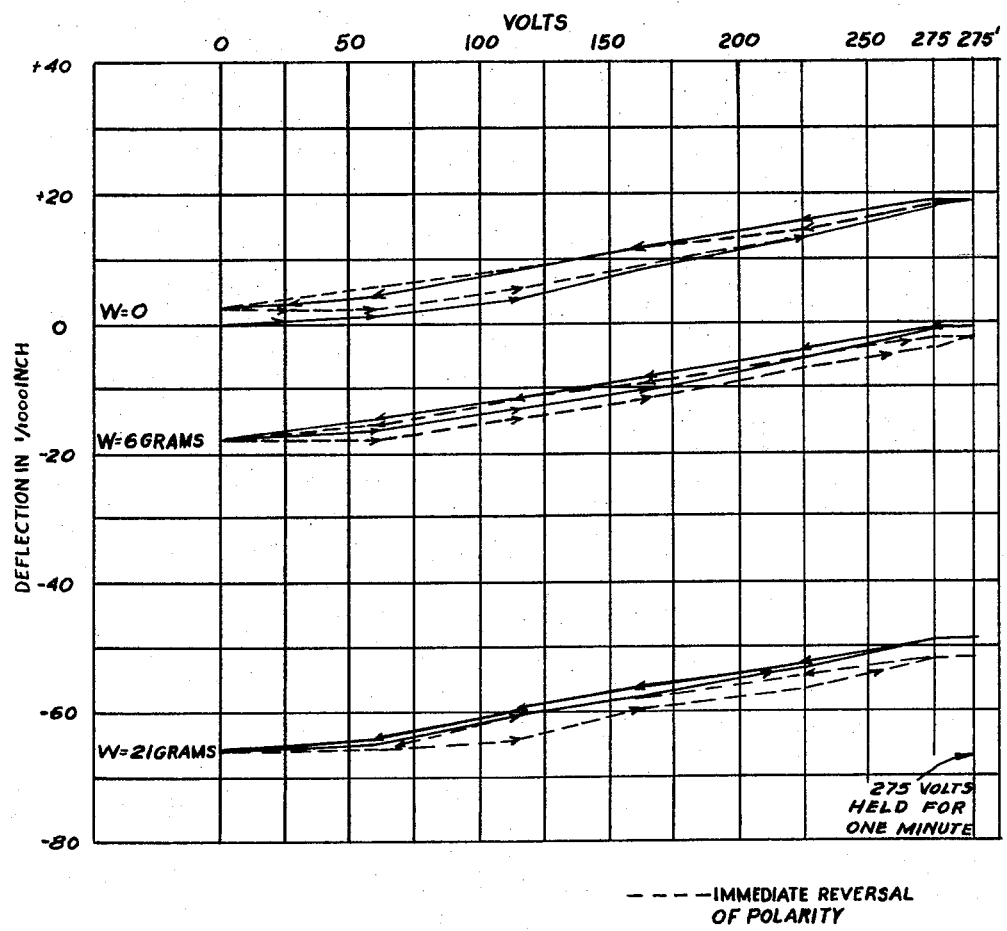
FIG. 20 is a graph showing the electrostrictive effect, or motion, of one of the examples of the invention.
Figure 21:
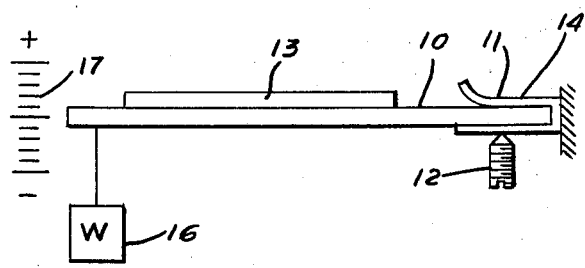
FIG. 21 is a schematic view of a test device for examining the electrostrictive motions of sample materials of the invention.

The electrostrictive motion of samples of the ware was checked in the manner indicated in FIGS. 20 and 21. In FIG. 21 numeral 10 designates a cantilever mounted beam in the form of a piece of steel mounted in a spring clamp 11 adjustable by screw 12. The electrostrictive ceramic strip (Example B) is shown at 13 having conductive coatings on opposite sides. Voltage may be applied through leads as shown at 14. A weight 16 is suspended from the end of the beam which applies an initial stress to the beam which may be varied as indicated in the graphs of FIG. 20. When voltage is applied to the electrostrictive ceramic element a deflection of the beam occurs and this was measured by a graduated sighting reticule which is indicated diagrammatically at 17, the graduations indicating the deflection of the end of the beam.

The curves of FIG. 20 indicate the deflection of the end of the beam with different weights applied over the range of voltage shown, the curves showing the deflection for both positive and negative voltage. It will be noted that the loop formed upon increasing and decreasing voltage is very narrow in all instances, indicating very low hysteresis. Furthermore, the loop formed on voltage of the opposite polarity, which is indicated in broken lines, is very close to the other loops, indicating the fact of the electrostrictivity of the material, i.e., that the motion is very nearly the same on both polarities of applied voltage. The motion factor given in Table II is a factor representing relative electrostrictive motion of samples. Ceramic samples 3″ long, unmounted, and of a thickness of 6 mils, have a voltage of 300 v. applied across them and the actual electrostrictive contraction measured. The actual motion in inches is equal to the motion factor × 10⁻⁴ inches.

The use of "consisting essentially of" in the appended claim is not intended to exclude small amounts of impurities such as may normally be present in commercially available barium titanate. Some variations in composition within the ranges given have been found desirable for manufacturing purposes such as (1) higher yield in firing, (2) modified thermal expansion, and (3) mechanical strength and density of the fired ware.

TABLE II

*Additives*

[Mol and weight percents]

| Example | Motion factor | BaTiO$_3$ Mol | TiO$_2$ Mol | TiO$_2$ Wt. | SnO$_2$ Mol | SnO$_2$ Wt. | ZrO$_2$ Mol | ZrO$_2$ Wt. | ½(Bi$_2$(SnO$_3$)$_3$) Mol | ½(Bi$_2$(SnO$_3$)$_3$) Wt. | CeO$_2$ Mol | ½(Bi$_2$O$_3$) Mol | ½(Bi$_2$O$_3$) Wt. |
|---|---|---|---|---|---|---|---|---|---|---|---|---|---|
| A | 5–6 | 97 | 1 | 0.35 | | | 1 | 0.53 | | | | 1 | 1.01 |
| B | 4–6 | 97 | 1 | 0.35 | 1 | 0.66 | 1 | 0.54 | | | | 1 | 1.02 |
| C | 5–6 | 97 | | | | | 2 | 1.06 | | | | 1 | 1.01 |
| D | 5–6 | 96 | 1 | 0.35 | | | 2 | 1.07 | | | | 1 | 1.02 |
| E | 4–5 | 96 | 1 | 0.35 | | | 2 | 1.06 | 0.5 | 0.99 | | 1 | 1.01 |
| F | 4–5 | 97 | 1 | 0.35 | | | 1 | 0.53 | 0.5 | 0.99 | | 1 | 1.0 |
| G | 4–6 | 95 | 2 | | | | | | | | 3 | | |
| H | 4–4.5 | 94 | | | | | 3 | | | | 3 | | |
| I | 4–5 | 95 | | | | | 2 | | | | 3 | | |
| J | 4–6 | 96 | | | | | 3 | | | | | 1 | |
| K | 3–4 | 95 | | | | | 3 | | | | | 2 | |
| L | 3–4 | 96 | 1 | | 1 | | | | | | | 2 | |
| M | 3–4 | 94 | 1 | | 1 | 3 | | | | | | 1 | |
| N | 3–4 | 96 | 2 | | | | 1 | | | | | 1 | |
| O | 3–4.5 | 95 | 2 | | | | 2 | | | | | 1 | |
| P | 3–4 | 96 | | | 3 | | | | | | | 1 | |

The foregoing disclosure is representative of preferred embodiments of our invention. Various alternatives and modifications may be adopted by those skilled in the art without departing from the spirit and scope of the invention, which is defined by the claim appended hereto.

We claim:

A ceramic composition consisting essentially of 95–97 mole percent BaTiO$_3$, ½–3 mole percent Bi$_2$O$_3$ and 1–3 mole percent ZrO$_2$.

References Cited in the file of this patent

UNITED STATES PATENTS

| 2,658,833 | Coffeen et al. | Nov. 10, 1953 |
| 2,708,243 | Brajer | May 10, 1955 |
| 2,776,898 | Day et al. | Jan. 8, 1957 |

FOREIGN PATENTS

| 574,577 | Great Britain | Jan. 11, 1946 |
| 1,102,534 | France | May 11, 1955 |

OTHER REFERENCES

Baldwin: "How To Use Electronic Ceramics Better," Ceramic Industry, August 1958 (pages 88–92).